(No Model.)
A. MORLEY.
FRUIT SEEDER.
No. 549,680. Patented Nov. 12, 1895.
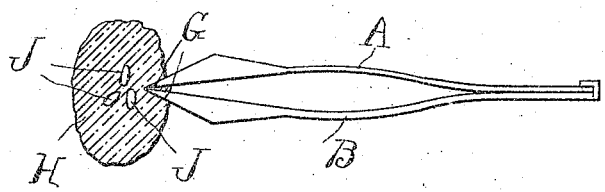
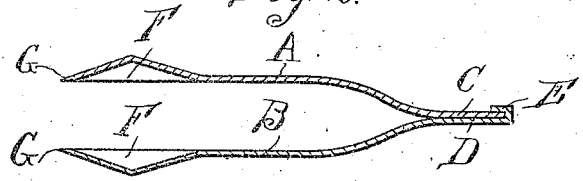
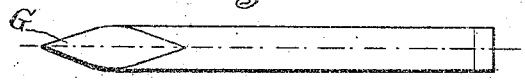
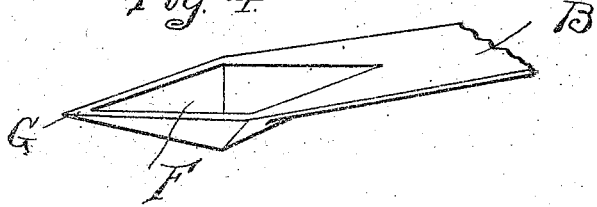
WITNESSES
Walter J. Gunthorp
D. M. Carter
INVENTOR
ALBERT MORLEY
By Francis W. Parker
ATTORNEY

UNITED STATES PATENT OFFICE.

ALBERT MORLEY, OF CHICAGO, ILLINOIS.

FRUIT-SEEDER.

SPECIFICATION forming part of Letters Patent No. 549,680, dated November 12, 1895.

Application filed March 15, 1894. Serial No. 503,731. (No model.)

*To all whom it may concern:*

Be it known that I, ALBERT MORLEY, a citizen of the United States, residing at Chicago, in the county of Cook and State of Illinois, have invented certain new and useful Improvements in Fruit-Seeders, of which the following is a specification.

My invention relates to seeding devices, and particularly to a device adapted for seeding raisins and the like. It is illustrated in the accompanying drawings, wherein—

Figure 1 is a view of the device being inserted into the fruit. Fig. 2 is a longitudinal section. Fig. 3 is a plan view. Fig. 4 is an enlarged detail of the seeding cavity and point.

Like parts are indicated by the same letter in all the figures.

A B are spring finger-pieces secured together at their ends C D in any desired manner—as, for example, by being brazed together—the part D being prolonged at E and bent over, so as to inclose the end of the part C. Each of these finger-pieces is formed at its outer end so as to present a seed-cavity F and terminates in a point G.

H is the fruit or raisin having the seeds J J.

K is the relatively-sharp edge of the seeding-cavity.

The use and operation of my invention are as follows: The two finger-pieces are normally separated, as indicated in Fig. 2, but they may be forced together even more closely than indicated in Fig. 1, and when the two points G G are thus forced together the exteriors of the seeding-cavities form the sharp conical point easily adapted to be forced into the fruit until the point comes into close proximity with the seeds. By relaxing the grasp on the device at this moment the springs will separate the seeding-cavities, whereupon the device may be pushed a little farther in and then the parts compressed, and the seeds will be gathered into the recess formed by the two cavities and the instrument withdrawn. This process may be continued without stopping to remove the seeds, as a considerable number can be carried in the cavities, and when the volume of seeds is excessive they will fall from the cavity. The sharp edge or outline of the cavities prevents the seeds from lodging and compels them to descend into the cavities proper.

It is evident that the device can be somewhat altered without departing from the spirit of my invention, and I do not wish to be limited to the precise proportions of the parts.

The springs should be strong enough to separate the pieces when they are inserted in the fruit.

It is obvious that the seeding-cavity could be on but one of the pieces, if that should be found to be more desirable.

I claim—

1. As a new article of manufacture, a seeder consisting of two parts normally separated and adapted to be forced together, the ends of the two parts forming together a point with the seed receiving cavity between them.

2. As a new article of manufacture, a seeder consisting of two spring finger pieces normally separated and provided each with a seeding cavity, said seeding cavity so formed that when the parts are forced together a conical point with said cavity therein, is formed.

3. As a new article of manufacture, a seeder consisting of two spring finger pieces normally separated and provided each with a seeding cavity, said seeding cavity so formed that when the two parts are forced together, a conical point with said cavity therein is formed, said seeding cavities provided with relatively sharp edges.

4. As a new article of manufacture, a seeder consisting of two spring finger pieces connected together at one end, the other ends being normally separated, each of said latter ends provided with a seeding cavity, said cavities so formed that when the two ends are brought together, they form a sharp point which can be easily inserted in the fruit to be seeded.

ALBERT MORLEY.

Witnesses:
WALTER J. GUNTHORP,
ALICE H. GEDDES.